(12) United States Patent
Tang

(10) Patent No.: US 12,196,356 B2
(45) Date of Patent: Jan. 14, 2025

(54) AIRBAG HOT WIND HEAT-INSULATING DEVICE

(71) Applicant: DIRECTLYTEK TECHNOLOGY CO., LTD., Hsinchu (TW)

(72) Inventor: Shih-Hao Tang, Hsinchu (TW)

(*) Notice: Subject to any disclaimer, the term of this patent is extended or adjusted under 35 U.S.C. 154(b) by 682 days.

(21) Appl. No.: 17/490,919

(22) Filed: Sep. 30, 2021

(65) Prior Publication Data

US 2023/0115481 A1   Apr. 13, 2023

(51) Int. Cl.
*F16L 53/32* (2018.01)

(52) U.S. Cl.
CPC .................... *F16L 53/32* (2018.01)

(58) Field of Classification Search
CPC .......... F16L 53/32; F16L 59/06; F16L 59/143
USPC ....................................................... 219/520
See application file for complete search history.

(56) References Cited

U.S. PATENT DOCUMENTS

| | | | |
|---|---|---|---|
| 4,784,215 A | 11/1988 | Sing | |
| 2014/0017139 A1* | 1/2014 | Szabo | A61M 16/009 422/173 |
| 2016/0016075 A1 | 1/2016 | Berk | |

FOREIGN PATENT DOCUMENTS

| | | |
|---|---|---|
| CN | 105757387 A | 7/2016 |
| JP | 1978095742 A | 8/1978 |
| JP | 1980088631 A | 7/1980 |
| JP | 11986146316 U | 9/1986 |
| JP | 11992043151 U | 4/1992 |
| JP | 2005282881 A | 10/2005 |
| TW | M448662 U | 3/2013 |
| TW | M572951 U | 1/2019 |

OTHER PUBLICATIONS

English Translation of Official Action for related JP Application No. 2016/0160759 dated Aug. 16, 2023.
English Translation of Official Action for related TW Application No. 110123122, dated Apr. 12, 2022.

* cited by examiner

*Primary Examiner* — Dana Ross
*Assistant Examiner* — James F Sims, III
(74) *Attorney, Agent, or Firm* — Egbert, McDaniel & Swartz, PLLC

(57) ABSTRACT

An airbag hot wind heat-insulation device includes an airbag unit, a heat insulation unit, a hot air supply unit, a return air pipe and a control unit, wherein an airflow channel is formed inside the airbag unit, and the hot air supply unit communicates with the airflow channel, and the hot air supply unit sends hot air to the airflow channel, thereby heating and insulating the heated object configured with the airbag unit. The return air pipe connects the airbag unit and the hot air supply unit, and the return air pipe connects the end of the path along which the hot air flows along the airflow channel and the air inlet end of the hot air supply unit, and accordingly returns the hot air to the hot air supply unit to improve heating efficiency.

8 Claims, 5 Drawing Sheets

AIRBAG HOT WIND HEAT-INSULATING DEVICE

CROSS-REFERENCE TO RELATED U.S. APPLICATIONS

Not applicable.

BACKGROUND OF THE INVENTION

1. Field of the Invention

The present invention relates generally to a heat-insulating device, and more particularly to an airbag hot wind heat-insulating device.

2. Description of Related Art Including Information Disclosed Under 37 CFR 1.97 And 37 CFR 1.98

In order to meet the particular needs in transporting certain materials, the pipelines conveying such materials must be maintained within a certain temperature range. Apart from heat insulation means to reduce loss of thermal energy, timely heat replenishment is necessary to maintain the temperature of the pipelines. Therefore, a special kind of electric heat-insulating device for pipelines is produced.

The conventional electric heat-insulating device for pipelines comprises an outer covering skin, an insulation layer and a heating device. The outer covering skin comprises an inner sidewall, an outer sidewall and a holding space. The holding space is located between the inner sidewall and the outer sidewall, and the inner sidewall is to cover a pipeline. The insulation layer is configured in the holding space, and the insulation layer comprises an aerogel felt and a thin film. The thin film covers the aerogel felt. The heating device is configured in the holding space, and the heating device has an electric heating board. The electric heating board clings to the inner sidewall, and the electric heating board is mainly made of a heat-insulating substrate arranged with an electric circuit. Based on the impedance characteristic of the electric circuit, when electric current passes through the electric circuit, the electric circuit will generate thermal energy to heat up the pipeline.

Based on the length or shape of the pipeline, a plurality of the above-mentioned electric heat-insulating devices are deployed sequentially along the pipeline. The electric heating boards of the electric heat-insulating devices are usually connected in series to simplify the overall circuit arrangement. However, the problem is, in case of overheat breakage or shortcut of any of the electric circuits in the electric heating boards or of the wires electrically connected to the electric circuits, none of the electric heating boards can continue to supply thermal energy. When there are a large number of electric heat-insulating devices, examining, repairing or replacing the failing component can be very difficult. Moreover, as the overheat breakage or shortcut occurs in the electric circuit, which is very close to the pipeline, it may cause breakage of the pipeline or affect the strength or durability of the pipeline. This is a safety problem to be considered.

BRIEF SUMMARY OF THE INVENTION

The main object of the invention is to provide an airbag hot wind heat-insulating device.

To accomplish the above object, the present invention provides a solution to overcome the aforementioned problem through the technical feature of an airbag hot wind heat-insulating device, which comprises:

an airbag unit, wherein, the inside of the airbag unit is formed with an air flow passage, one side of the airbag unit is defined as first side, the other side of the airbag unit is defined as second side, the first side and the second side are opposite to each other along the thickness direction of the airbag unit, so that the first side clings to the outside of a heat receiver, and the airbag unit is fitted on the heat receiver;

a heat insulation unit, said heat insulation unit is mainly made of materials having heat-insulating properties, and the heat insulation unit is adjacent to the second side;

a hot wind supplying unit, the hot wind supplying unit is communicated to the air flow passage, the hot wind supplying unit comprises a heater and a blower, so that the hot wind supplying unit feeds hot wind into the air flow passage to heat up the heat receiver and maintain its temperature;

a return duct, the return duct is connected to the airbag unit and the hot wind supplying unit, and the return duct is communicated to the terminal end of the air flow passage along which the hot wind flows and the air inlet end of the hot wind supplying unit, so as to return hot wind to the hot wind supplying unit to enhance heating efficiency; and a control unit, the control unit is mainly made of an electronic circuit, the heater and the blower are respectively coupled with the control unit so that the operation of the heater and the blower can be controlled.

The main efficacy and advantage of the invention is that it can enhance the safety of usage as well as the convenience of maintenance. Moreover, using the return duct to return hot wind to the hot wind supplying unit, the overall heat-insulating efficiency can be enhanced.

A secondary object of the invention is to enlarge the range of application of the airbag unit by providing an airbag unit comprising a plurality of hollow airbags and a plurality of hollow communicating pipes. Based on this technical feature, the airbag unit can be constructed using multiple modular airbags. This is truly an advantageous inventive step.

DETAILED DESCRIPTION OF THE INVENTION

FIG. 1 to FIG. 5 are embodiment figures of the airbag hot wind heat-insulating device. However, such embodiment is for illustrative purpose only, and is not intending to limit the scope of the invention.

Figure 1:
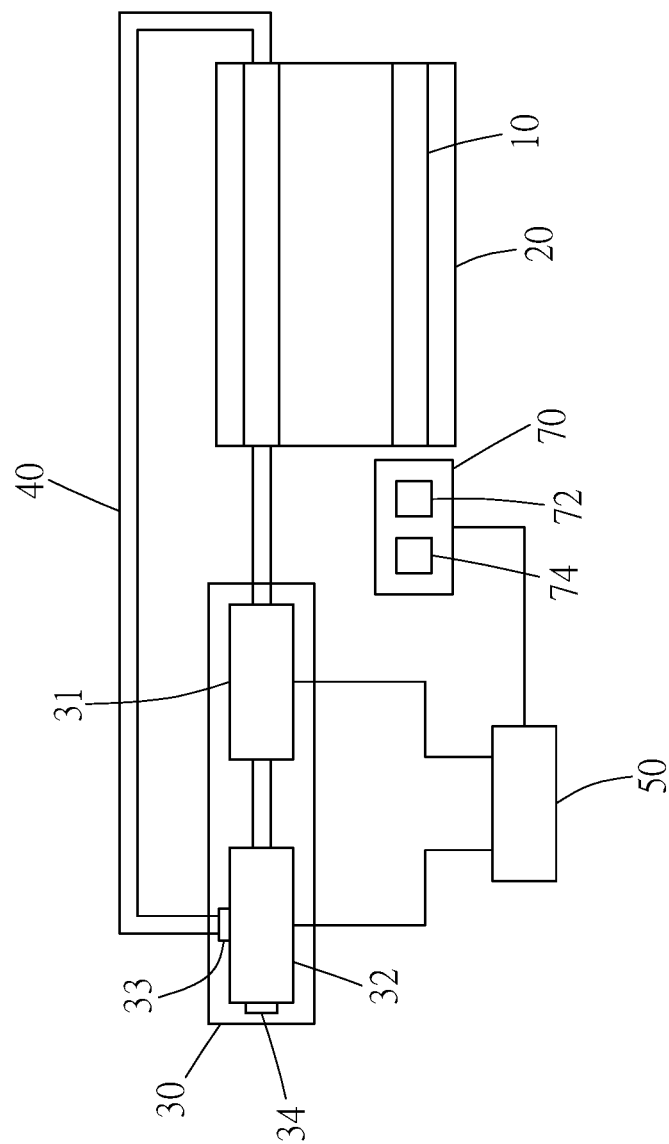
FIG. 1 is a system deployment figure of Embodiment 1 of the present invention.
Figure 2:
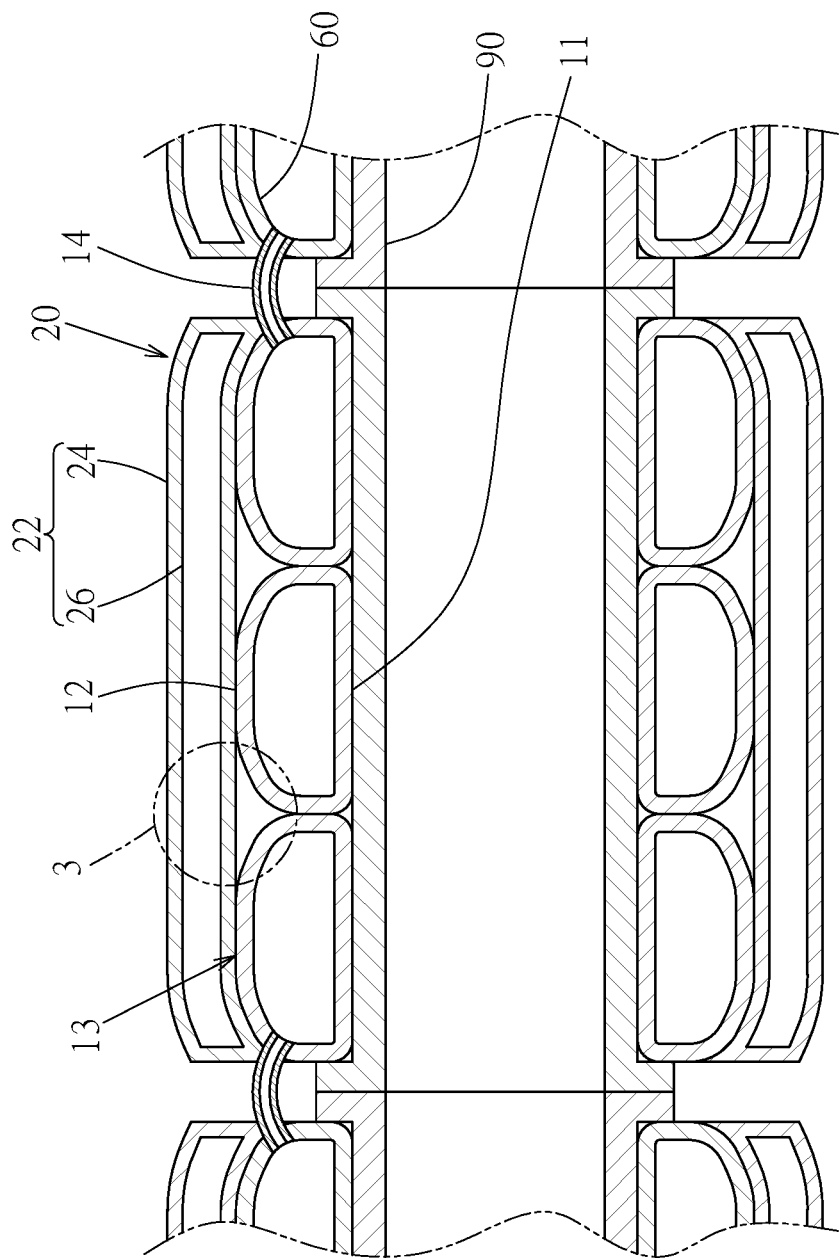
FIG. 2 is a partial sectional view of Embodiment 1 of the present invention, with the airbag unit and heat insulation unit fitted on the heat receiver.

Referring to FIG. 1 to FIG. 4, Embodiment 1 of the airbag hot wind heat-insulating device comprises an airbag unit 10, a heat insulation unit 20, a hot wind supplying unit 30, a return duct 40 and a control unit 50. Wherein, the inside of the airbag unit 10 is formed with an air flow passage 60, one side of the airbag unit 10 is defined as first side 11, and the other side of the airbag unit 10 is defined as second side 12. The first side 11 and the second side 12 are opposite to each other along the width of the airbag unit 10, so that the first side 11 clings to the outside of a heat receiver 90, and the heat receiver 90 is fitted on the airbag unit 10. The heat receiver 90 shown in FIG. 2 is a pipeline. Embodiment 1 can be fitted on any object that needs heating and heat insulation. FIG. 2 cannot be construed to be limiting to the range of the invention.

The heat insulation unit 20 is mainly made of materials having heat-insulating properties. The heat insulation unit 20 is adjacent to the second side 12. The hot wind supplying unit 30 is communicated to the air flow passage 60. The hot wind supplying unit 30 comprises a heater 31 and a blower 32, so that the hot wind supplying unit 30 can feed hot wind into the air flow passage 60 to heat up the heat receiver 90 and maintain its temperature.

The return duct 40 is connected to the airbag unit 10 and the hot wind supplying unit 30, and the return duct 40 is communicated to the terminal end of the air flow passage 60 along which the hot wind flows and the air inlet end 33 of the hot wind supplying unit 30, so as to return the hot wind to the hot wind supplying unit 30 to enhance heating efficiency.

The control unit 50 is mainly made of an electronic circuit, the heater 31 and the blower 32 are respectively coupled with the control unit 50, so that the operation of the heater 31 and the blower 32 can be controlled. The control unit 50 is a device commonly known by professional specializing in electronics or electric machines, and its composition is therefore not detailed here.

The hot wind supplying unit 30, the return duct 40 and the air flow passage 60 forms a path for cycled air flow. The control unit 50 controls the operation of the hot wind supplying unit 30, the blower 32 feeds in air, the heater 31 heats up the air, so that hot wind is introduced into the air flow passage 60. The hot wind passes through the air flow passage 60 and goes into the return duct 40, then, the return duct 40 returns the hot wind into the hot wind supplying unit 30. When the hot wind passes through the air flow passage 60 inside the airbag unit 10, the hot wind will heat up the heat receiver 90 adjacent to the first side 11, thus replenishing the lost thermal energy of the heat receiver 90. The heat insulation unit 20 adjacent to the second side 12 can reduce dissipation of the thermal energy of the hot wind and the heat receiver 90 toward the outside, and can enhance the efficiency for the hot wind to heat up the heat receiver 90. Comparing to the conventional electric heat-insulating device disclosed in the prior art, Embodiment 1 uses a heater 31 to supply thermal energy, omitting the need to deploy electric heating boards on the surface of the heat receiver 90, and can therefore enhance the convenience of repairing and maintenance. Also, it can avoid the occurrence of overheat breakage or shortcut of circuit at positions nearby the heat receiver 90 to jeopardize the heat receiver 90. Therefore, it features higher safety.

The hot wind passes through the return duct 40 and is returned to the hot wind supplying unit 30. The thermal energy supplied by the heater 31 to the hot wind only needs to replenish the thermal energy released to the heat receiver 90 and the thermal energy dissipated outward during the process when the hot wind passes through the air flow passage 60 and the return duct 40, and the temperature of the hot wind can rise to its preset temperature. Thus, the overall heating and heat-insulating efficiency is enhanced.

As required, the inside of the airbag unit 10 can be formed with a plurality of air flow passages 60, and each air flow passage 60 can opt to be communicated to one or multiple return ducts 40, or, the air flow passages 60 can opt to be communicated to the same the return duct 40, so as to form a variation based on Embodiment 1. The number options of the air flow passages 60 and the return ducts 40 can be easily conceived by those skilled in the art based on Embodiment 1.

Figure 3:
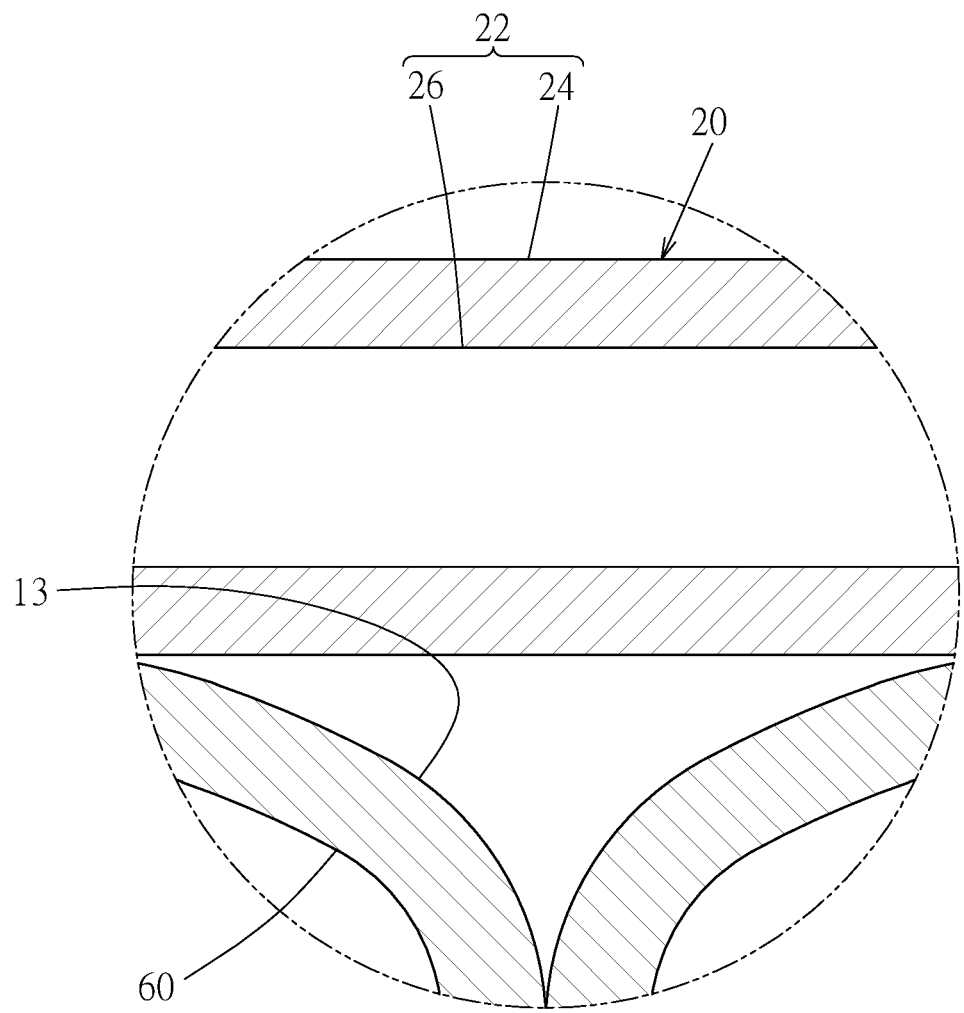
FIG. 3 is a partial enlarged view of FIG. 2.

Referring to FIG. 2 and FIG. 3, the airbag unit 10 comprises a plurality of hollow airbags 13 and a plurality of hollow communicating pipes 14, wherein, each airbag 13 is respectively in a winding and wrapping form, the airbags 13 are connected to each other in series, the communicating pipes 14 are respectively configured between the adjacent airbags 13, and each communicating pipes 14 is respectively communicated to each of the adjacent airbags 13, so that the inside of the airbags 13 and the communicating pipes 14 are communicated to each other to form the air flow passage 60.

The airbag unit 10 can be constructed with a plurality of modular airbags 13 with a matching quantity of communicating pipes 14. According to the sizes, shapes and space types of the heat receiver 90, the airbag unit 10 can be configured with an appropriate number of airbags 13 and communicating pipes 14. Through the communicating pipes 14, the adjacent airbags 13 can be communicated to each other. In this way, the airbag unit 10 can have a larger application range.

Each airbag 13 is preferably made of elastic materials. Thus, when the hot wind passes through each air flow passage 60, the pressure of the hot wind will cause the elastic airbag 13 to expand. Under the limitation from the heat insulation unit 20 to the second side 12, the first side 11 can be tightly pressed on the heat receiver 90, thus enhancing the reliability of heat transmission from the hot wind passing through the first side 11 toward the heat receiver 90.

Figure 4:
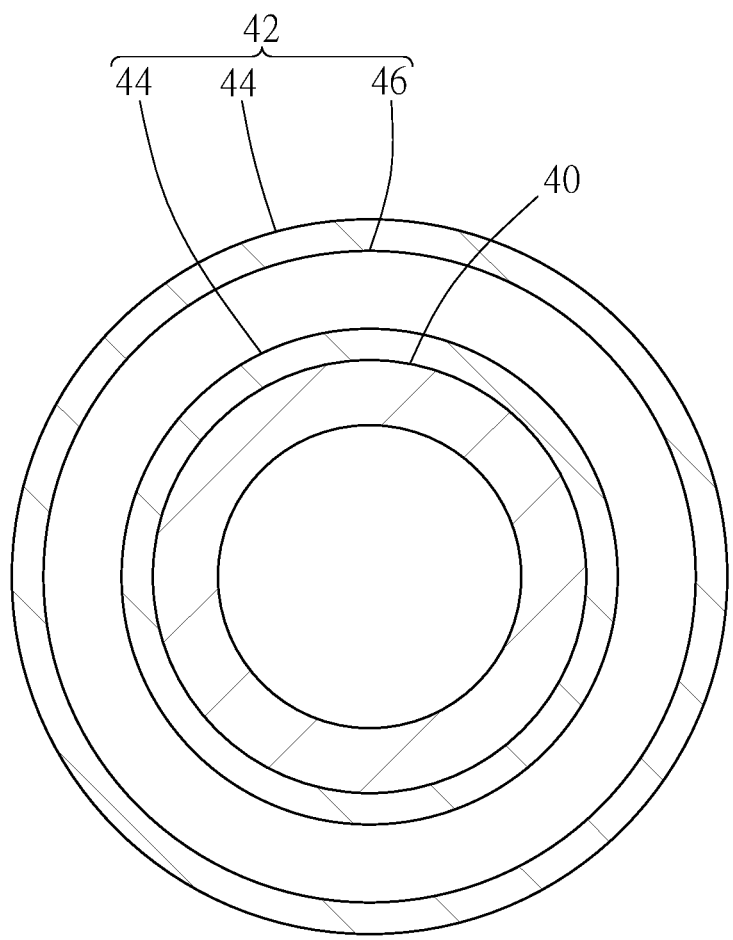
FIG. 4 is a sectional view of the return duct of Embodiment 1 of the present invention.

Referring to FIG. 4, the periphery of the return duct 40 can be covered by a heat-insulating component 42 as needed, thus reducing heat dissipation of the hot wind passing through the return duct 40. Furthermore, the heat-insulating component 42 can be made of two tube-shape external films 44 placed face to face to form a heat insulating portion 46. The heat insulating portion 46 is made of materials having heat-insulating properties to reduce heat dissipation and loss when the hot wind passes through the return duct 40 toward the hot wind supplying unit 30.

Referring to FIG. 2 and FIG. 3, the heat insulation unit 20 comprises a plurality of heat insulation structures 22, each heat insulation structure 22 is respectively configured to match each airbag 13. Optionally, a plurality of heat insulation structures 22 can be configured as needed to correspond to the same airbag 13, or, one heat insulation structure 22 can correspond to a plurality of airbags 13, thus forming variations based on Embodiment 1. Each heat insulation structure 22 respectively has a covering bag 24 and a heat insulating felt 26, each covering bag 24 respectively houses each heat insulating felt 26, the heat insulating felt 26 and the heat insulating portion 46 are respectively made of aerogel composite nanomaterials having heat-insulating properties. The heat insulating felt 26 can also be made of other materials with good heat-insulating properties. Said aerogel composite nanomaterials mainly uses non-woven carbon fiber or strengthened glass fiber as carrier. Liquid aerogel is evenly distributed on the carrier. In the end, the containing gels are removed, leaving numerous nanoscale pores. Said aerogel composite nanomaterials has a low heat conductivity, and can effectively reduce dissipation of the thermal energy from the heat receiver 90 and the hot wind toward outside through the heat insulating felt 26, thus saving energy and reduce carbon consumption. Furthermore, the width of the heat insulating felt 26 can be reduced to one third or even one fourth of the conventional heat-insulating materials. As a result, it can dramatically reduce space occupation.

Referring to FIG. 1, the hot wind supplying unit 30 is configured with an air inlet 34, the air inlet 34 is communicated to the outside environment, so that the hot wind supplying unit 30 can introduce external air through the air inlet 34, so as to replenish the air loss during the cycled flow of the hot wind.

The heater 31 is communicated to the air flow passage 60, the blower 32 is communicated to the heater 31, so that the blower 32 can absorb air, the heater 31 heats up the air to form the hot wind, and supplies the hot wind to the air flow passage 60. The heater 31 is located between the air flow passage 60 and the blower 32. The air inlet end 33 is configured on the blower 32. In Embodiment 1, the blower 32 can also be configured between the heater 31 and the air flow passage 60, and the air inlet end 33 can be configured in the heater 31, thus forming another variation not depicted in the figures. The space deployment variations of the heater 31 and the blower 32 can be easily conceived by those skilled in the art based on Embodiment 1.

Embodiment 1 further includes a detecting unit 70, wherein, the detecting unit 70 comprises a temperature detector 72 and an air pressure detector 74. The temperature detector 72 and the air pressure detector 74 respectively detects the temperature and pressure of the hot wind passing through the air flow passage 60. The temperature detector 72 and the air pressure detector 74 are respectively coupled with the control unit 50. The temperature detector 72 and the air pressure detector 74 respectively transmits the temperature value and pressure value obtained through detection to the control unit 50. The control unit 50 controls the operation of the heater 31 and the blower 32 according to the temperature and pressure values. In this way, the temperature and pressure of the hot wind passing through the air flow passage 60 can be maintained within the preset range, so as to enhance the heating and insulating efficiency.

Figure 5:
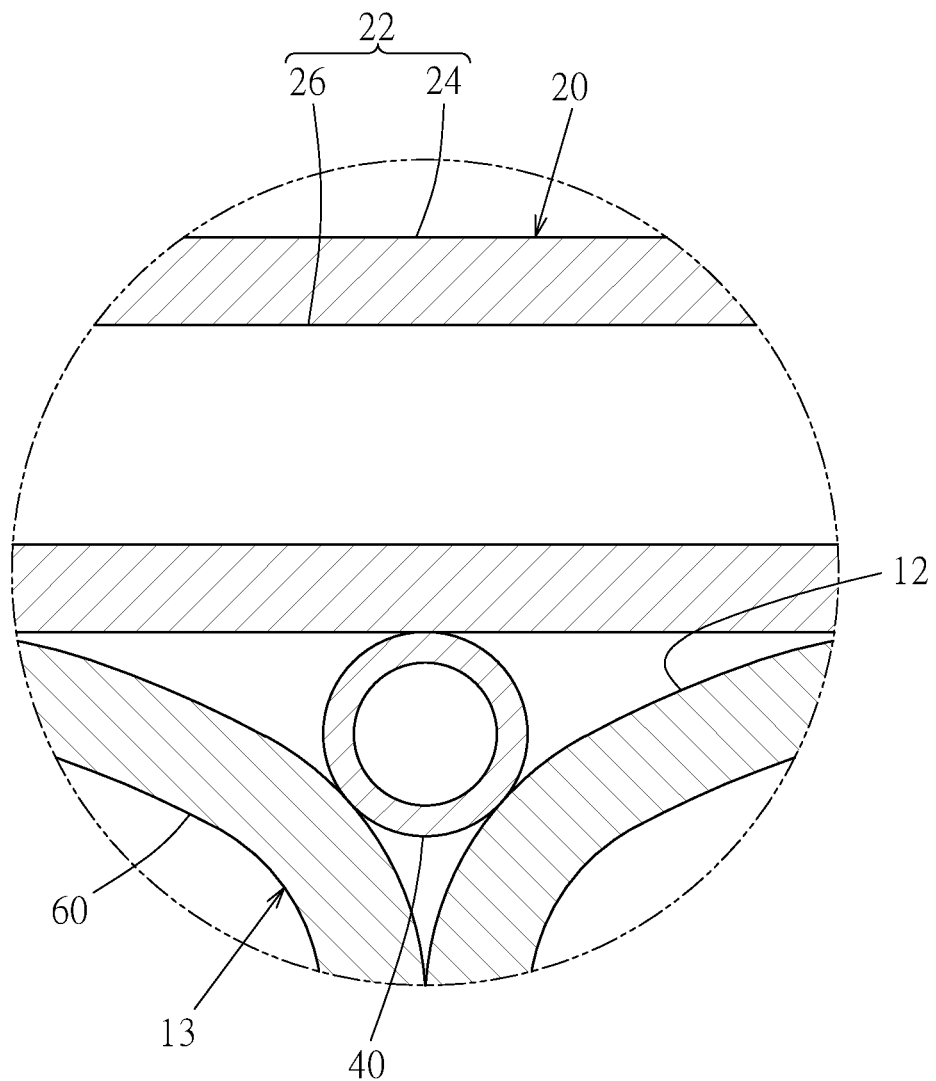
FIG. 5 is a partial sectional view of Embodiment 2 of the present invention showing the airbag unit and heat insulation unit.

Referring to FIG. 5, Embodiment 2 differs from Embodiment 1 main in that, the return duct 40 goes between the second side 12 and the heat insulation unit 20, the heat insulation unit 20 insulates the heat of the return duct 40 to reduce heat dissipation of the hot wind passing through the return duct 40, the periphery of the return duct 40 is not configured with a heat-insulating component 42, thus, the heat dissipating from the hot wind passing through the air flow passage 60 toward the second side 12 can be absorbed by the hot wind passing through the return duct 40. In this way, when the hot wind is returned to the hot wind supplying unit 30, there is less need for the heater 31 to replenish heat to the hot wind, and the overall heat-insulating efficiency is enhanced.

I claim:

1. An airbag hot wind heat-insulating device comprising:
an airbag unit having an air flow passage on an interior thereof, said airbag unit having a first side and a second side opposite to each other across a thickness of said airbag unit, the first side adapted to cling to an exterior of a heat receiver such that said airbag unit is fitted on the heat receiver;
a heat insulation unit formed of a heat insulating material, said heat insulation unit being adjacent the second side of said airbag unit;
a hot wind supplying unit communicating with the air flow passage of said airbag unit, said hot wind supplying unit having a heater and a blower such that said hot wind supplying unit supplies hot wind to the air passage of said airbag unit so as to heat up and maintain a temperature of the heat receiver;
a return duct connected to said airbag unit and to said hot wind supplying unit, said return duct communicating with a terminal end of the air flow passage of said airbag unit and with an air inlet end of said hot wind supplying unit, said return duct returning the hot wind to said hot wind supplying unit; and
a control unit having an electronic circuit, the heater and the blower of said hot wind supplying unit being respectively coupled to said control unit, said control unit adapted to control an operation of the heater and the blower of said hot wind supplying unit, wherein said return duct extends between the second side of said airbag unit and said heat insulation unit.

2. The airbag hot wind heat-insulating device of claim 1, wherein said airbag unit has a plurality of hollow airbags and a plurality of hollow communicating pipes, each airbag of the plurality of hollow airbags being respectively in a winding and wrapping form, the plurality of hollow airbags being connected to each other in series, each hollow communicating pipe of the plurality of hollow communicating pipes being positioned between adjacent airbags of the plurality of hollow airbags so as to respectively communicate to the adjacent airbags such that an interior of each of said plurality of hollow airbags and the plurality of hollow communicating pipes communicate so as to define the air passage of said airbag unit.

3. The airbag hot wind heat-insulating device of claim 1, wherein a periphery of said return duct is covered with a heat-insulating component.

4. The airbag hot wind heat-insulating device of claim 1, wherein said heat insulation unit has a plurality of heat insulation structures, each heat insulation structure of the plurality of heat insulation structures has a covering bag and a heat insulating felt, the covering bag housing the heat insulating felt, wherein the heat insulating felt is formed of an aerogel composite nanomaterial.

5. The airbag hot wind heat-insulating device of claim 1, wherein hot wind supplying unit has an air inlet, the air inlet of said hot wind supplying unit adapted to communicate with an exterior environment such that said hot wind supplying unit passes air from the exterior environment, the heater of said hot wind supplying unit communicating with the air flow passage of said airbag unit, the blower of said hot wind supplying unit communicating with the heater of said hot wind supplying unit such that the blower introduces air while the heater heats the air in order to deliver hot wind to the air flow passage.

6. The airbag hot wind heat-insulating device of claim 1, wherein the heater is positioned between the blower and the air flow passage of said airbag unit, the blower having the air inlet of said hot wind supplying unit thereon.

7. The airbag hot wind heat-insulating device of claim 4, wherein the heater is positioned between the blower and the air flow passage of said airbag unit, the blower having the air inlet of said hot wind supplying unit thereon.

8. The airbag hot wind heat-insulating device of claim 1, further comprising:
   a detector unit having a temperature detector and an air pressure detector, the temperature detector detecting a temperature of the hot wind passing through the air flow passage, the air pressure detector detecting an air pressure of the hot wind passing through the air flow passage, wherein said control unit is coupled to the temperature detector and the pressure detector.

* * * * *